Oct. 17, 1933.   J. H. BARRETT   1,930,833
SWIVELING HOSE UNION
Filed Aug. 19, 1929
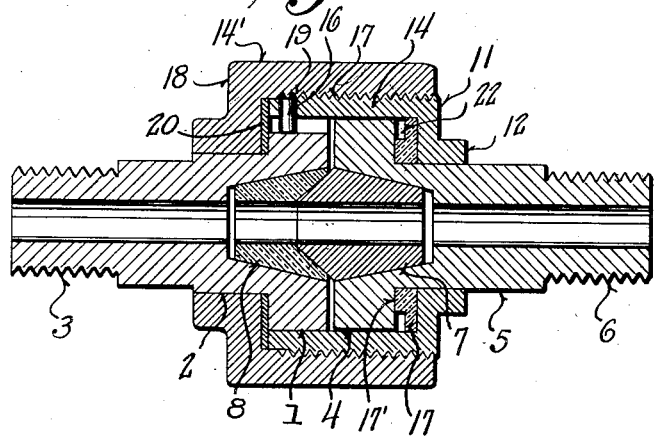
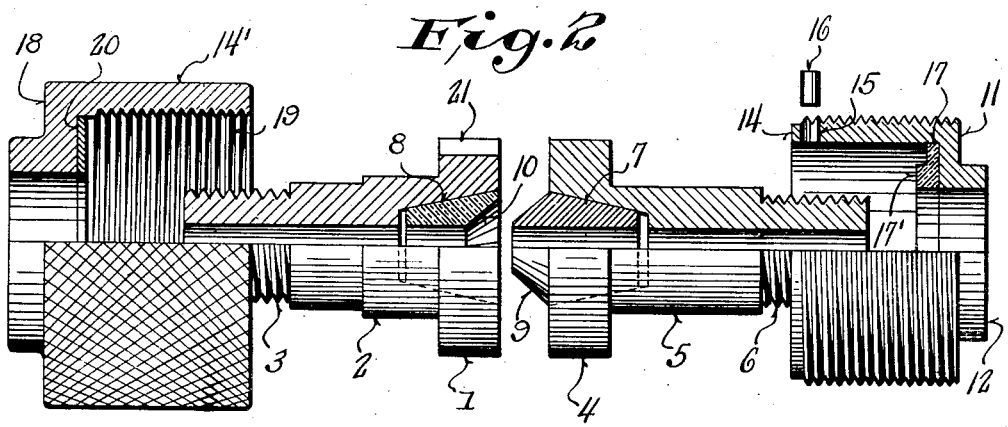
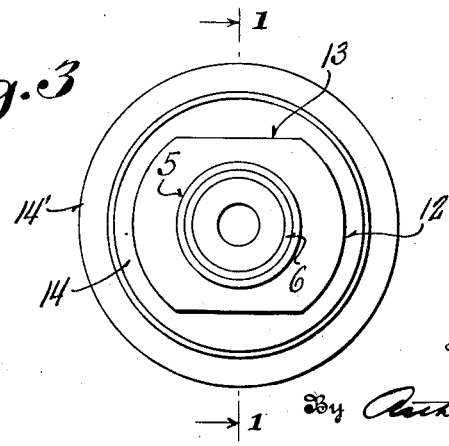
Inventor
James H. Barrett
By Arthur R. Woolfolk
Attorney

# UNITED STATES PATENT OFFICE 1,930,833

SWIVELING HOSE UNION

James H. Barrett, Two Rivers, Wis., assignor to Eastman Mfg. Co., Manitowoc, Wis.

Application August 19, 1929. Serial No. 386,821

10 Claims. (Cl. 285—9)

This invention relates to swiveling hose union for use in joining hoses to each other or to a supply pipe.

Objects of this invention are to provide a swiveling hose union which is so constructed that it may be used on high pressure lines for carrying both gases and liquids and which insures against leaking, although very high pressure may be employed.

Further objects are to provide a novel form of swiveling hose union which is so made that it cannot become unscrewed during use, irrespective of the amount of turning or rotary motion imparted to the swiveling head and in which the construction is such that the swiveling is easy and free from excessive friction, although the pressure in the line may be very high.

Further objects are to provide a swiveling hose union which is so made that a main seating is secured between the body portion and the swiveling head and in which an auxiliary seating or rear packing is provided, both for the swiveling head and for the body portion, to thereby secure a double protection against leaking.

Further objects are to provide a swiveling hose union in which the swiveling head and the body portion are so made that they may have cone-shaped seating members formed of a different material from the body portion and head, respectively, in which the materials used for the seating portions may be of any type, for example, tool steel and fiber have been found very satisfactory and have geen found to give a long life to the device.

Further objects are to provide a swiveling union in which a swiveling head is so carried within the union that the high pressure employed does not cause excessive binding or excessive friction, but instead of which means are provided for applying a part of this high pressure to both sides of the swiveling head so that somewhat of a balancing action takes place, thereby minimizing friction and excessive bearing pressures, although maintaining a substantially perfectly tight joint at all times.

Further objects are to provide a novel form of swiveling hose union which has a relatively small number of easily produced parts, which is very easy to assemble and disassemble, and which may be very cheaply produced.

An embodiment of the invention is shown in the accompanying drawing, in which:—

Figure 1 is a sectional view through the assembled union, such section being taken on the line 1—1 of Figure 3.

Figure 2 is a view, partly in section, showing the parts separated.

Figure 3 is an end view of the structure shown in Figure 1.

Referring to the drawings, it will be seen that the device comprises a body portion 1 having a rearwardly extending shank 2 terminating in a threaded portion 3. The swiveling head 4 may be of approximately the same diameter as the head of the body portion 1. This swiveling head is provided with a rearwardly extending shank 5 which terminates in a threaded portion 6.

The swiveling head and the body portion may be provided with seating members formed of any desired material, for example, it has been found eminently satisfactory in practice to provide a tool steel seating member 7 for the swiveling head and a fiber seating member 8 for the body portion. These members are reversely coned. For example, the member 7 may have the coned outer or projecting portion 9 which seats within the female cone 10 of the member 8.

It is to be distinctly understood that the seating members may be formed of other materials from that described, and may be of the same or different material from that of the body portion and the swiveling head. In practice the materials specified above have been found very satisfactory. The body portion and the swiveling head may be made of machine steel, if desired, or of other material.

A head collar 11 is provided for the swiveling head and has an outwardly projecting hub 12 through which the shank 5 of the swiveling head projects. This hub may be provided with flattened faces 13, as shown in Figure 3, to facilitate screwing the device together in the manner hereinafter described.

The head collar 11 is provided with a flange 14, which is externally threaded and which is provided with an aperture 15 adapted to receive a locking pin 16. It is to be noted also that the head collar carries a seating or bearing washer 17 which preferably has a reduced bearing portion 17' adapted to engage the outer or rear face of the swiveling head. The area of contact between the washer and the swiveling head is of small external diameter, whereby it is concentrated or located as near the axis as possible in order to reduce friction on the one hand and to allow a clearance space back of the swiveling head for a purpose hereinafter to appear.

A body collar 18 is provided with a flange 14' and is adapted to enclose the flange 14 of the head collar. This body collar or union sleeve may be provided with a knurled outer surface as shown, or it may be provided with flat faces to facilitate screwing the parts together. It is internally threaded, as indicated at 19 in Figure 2, and is adapted to be screwed upon the flange 14 of the head collar. A washer or pack member 20 is carried within the union sleeve or body collar and bears against the rear or outer face of the body portion 1 when the device is assembled.

In assembling the device, the swiveling head is slipped into place within the head collar 11, and the body portion 1 is also slipped into the flange 14 of the head collar. The body portion 1, it will be noted, is provided with an axially extending groove or slot 21 which during assembly is caused to register with the opening 15. Thereafter the pin 16 is passed through the aperture 15 and into the groove 21. The body collar is next screwed into place, as shown in Figure 1, thereby holding the locking pin against radial motion and forcing the seating members 7 and 8 into intimate contact with each other.

Further it is to be noted that when the parts are screwed together, as shown in Figure 1, the portion 17' of the rear seat 17 bears against the outer face of the swiveling head and that the packing washer 20 bears against the rear or outer face of the body portion. Preferably the packing washer 20 also bears against the extreme inner face of the flange 14 of the swiveling head collar, as shown in Figure 1.

The rear seat member or washer 17 may be formed of fiber, hard rubber, or other suitable material, and similarly the washer or packing 20 may be made of any desired material. Further than this, it is apparent that the rear seats or washers 17 and 20 may be formed of metal, if so desired. No relative motion occurs between the washer 20 and the rear face of the body portion 1 when the device is in service, and consequently a different material could be used for the washer 20 than for the washer 17, if desired.

It is to be noted particularly, from reference to Figure 1, that when the parts are completely assembled, there is no relative turning movement permitted between the body portion and the head collar, due to the interlocking of the parts through the agency of the pin 16 and the slot 21. However, relative axial motion is permitted during tightening of the union. It will be seen from this construction that there is no tendency for the device to unscrew in actual use, as there is no relative motion between the body portion and the head collar or between the body portion and the body collar or union sleeve. These parts remain as a unitary structure in actual use, and the only relative turning motion occurs between the swiveling head and the body portion and between the swiveling head and the head collar. Consequently there is no chance whatsoever of the device becoming unscrewed in service.

It is to be appreciated that, inasmuch as there is not a machined fit between the inner portion of the flange 14 of the head collar and the swiveling head and body portion, a slight clearance exists which is in communication with the space rearwardly of the swiveling head 4 and indicated by the reference character 22 in Figure 1. It is to be noted that any fluid that finds its way past the seating members 7 and 8 will build up pressure within the clearance space and within the space 22. The pressure rearwardly of the swiveling head 4 acts to somewhat counterbalance the pressure on the opposite side of the swiveling head, and consequently there is a tendency to even up the actual thrust on the swiveling head, so that excessive bearing pressures will not be produced.

It is to be noted also that there is a double protection against leaking; namely, there is the protection against leaking due to the members 7 and 8, and also due to the contacting of the swiveling head with the portion 17' of the washer 17 and of the body portion with the washer 20.

It will be seen that a novel form of swiveling hose union has been provided by this invention which cannot become unscrewed in use, which has a minimum amount of friction resisting swiveling action, which provides a substantially perfect sealing against internal pressure, and which is relatively simple, easy to assemble and disassemble, and which is inexpensive to manufacture.

Although this invention has been described in considerable detail, it is to be understood that such description is intended as illustrative rather than limiting, as the invention may be variously embodied and is to be interpreted as claimed.

I claim:

1. A swiveling hose union comprising a tubular body member, a tubular swiveling head, a collar member for holding said head in swiveling engagement with said body member, and a removable pin carried by one of said members and engaging a slot formed in the other of said members, whereby said members may have relative axial sliding motion and are restrained against relative rotary motion.

2. A swiveling hose union comprising a tubular body member, a tubular swiveling head, a collar member for holding said head in swiveling engagement with said body member, one of said members having a flange extending over the other member, and a pin carried by one member and slidably fitting within an axially extending groove in the other member, to prevent relative rotation of said members.

3. A swiveling hose union comprising a tubular body, a tubular swiveling head, a collar for holding said head in swiveling engagement with said body, and means for preventing relative rotation of said body and collar, said swiveling head having a rear fluid-tight seating against said collar of less external diameter than said head, whereby the resistance of swiveling movement is minimized.

4. A swiveling hose union comprising a tubular body, a tubular swiveling head, a collar holding said head in swiveling engagement with said body, a front and a rear seat located at the points where said head articulates with said body and said collar, respectively, said front seat being formed of two annular fluid-tight seating members and a casing surrounding said head and forming a side clearance around said head inside of such casing, said rear seat being of less diameter than said head, whereby a rear clearance space is formed around such rear seat and at the rear of said head, said rear clearance space being continuous with said side clearance space, whereby any fluid under pressure which may accumulate in said clearance spaces exerts a pressure on the rear of said head.

5. A tubular body having a neck, a tubular swiveling head having a neck, a head collar extending around the neck of said swiveling head and having a flange externally threaded and extending over the swiveling head and over the body, means for preventing relative rotation of said head collar and said body, a body collar extending around the neck of said body and having a flange overhanging and screw threaded to the flange of said head collar, a gasket between said body collar and the rear of said body, a first articulating bearing between said head collar and the rear of said swiveling head, and a second articulating bearing between said head collar and swiveling head, said second bearing being fluid-tight.

6. A swiveling hose union comprising a tubular body, a tubular swiveling head in axial alignment with said body, a first antifriction seat inserted between said body and said head, a second antifriction seat inserted at the rear of said head, said first seat comprising two continuous annular portions in fluid-tight relation, and means for retaining said second seat in position relative to said body, said last named seat being of less external diameter than said swiveling head.

7. A swiveling hose union comprising a tubular body, a tubular swiveling head in axial alignment with said body, a first antifriction seat between said body and said head, a second antifriction seat inserted at the rear of said head, and means for retaining said second seat in position relative to said body, said seats at the front and rear respectively of said swiveling head being one of them coned and the other flat, whereby said head may rotate without binding.

8. A tubular body having a neck, a tubular swiveling head having a neck, a head collar extending around the neck of said swiveling head and having an externally threaded flange extending over said swiveling head and over said body, said body having a longitudinally extending slot, a pin carried by said head collar and slidably seated within said slot, and a body collar extending around the neck of said body and having an internally threaded flange screwed over the flange of said head collar.

9. A tubular body having a neck, a tubular swiveling head having a neck, a head collar extending around the neck of said swiveling head and having an externally threaded flange extending over said swiveling head and over said body, means for preventing relative rotation of said head collar and said body, a body collar extending around the neck of said body and having an internally threaded flange extending over the flange of said head collar and screwed thereon, said flange of said head collar being of such length that it is substantially flush with the rear of the body when the parts are assembled, and a sealing gasket between said body collar and the rear of said body, said head collar bedding itself into said gasket to substantially the same depth as said body, thereby forming a uniform seal against said gasket.

10. A swiveling hose union comprising a body member; a swiveling member; an inner sleeve member having a collar; an outer sleeve member having a collar; said body member and said swiveling member each comprising a head portion rigid with a tubular neck portion; said inner sleeve member comprising a collar portion fitting around the neck portion of said swiveling member, and an inner sleeve portion extending over both said head portions; said outer sleeve member comprising a collar portion fitting around the neck portion of said body member, and an outer sleeve portion extending over said inner sleeve portion; and means for preventing relative rotation between said inner sleeve portion and said body member.

JAMES H. BARRETT.